Patented Oct.

UNITED STATES PATENT OFFICE 2,485,681

METHYLENEDIOXYPHENYL DERIVATIVES AND METHOD FOR THE PRODUCTION THEREOF

Herman Wachs, Brooklyn, N. Y., assignor to U. S. Industrial Chemicals, Inc., New York, N. Y., a corporation of Delaware No Drawing. Application February 20, 1947, Serial No. 729,883

20 Claims. (Cl. 260—338)

This invention relates to the methylenedioxyphenyl derivatives and method for the production thereof and includes a process for their production and the new compounds resulting therefrom as well as insecticide compositions containing the same in admixture with pyrethrins.

The new compounds or products contain the methylenedoxy phenyl (or alkyl substituted phenyl) group or radical and a glycol or polyglycol ether radical united through an aliphatic hydrocarbon radical and may be considered to have a common general structural formula X—Y—Z, in which X is the methylenedioxy phenyl (or alkyl substituted phenyl) group or radical, Y is an aliphatic hydrocarbon radical or group and Z is a glycol or polyglycol ether radical or group.

The composition or formula, expressed somewhat more graphically, may be represented as follows:

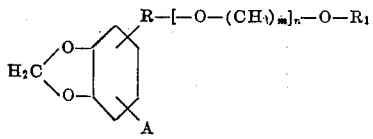

in which A is hydrogen or an aliphatic radical on the benzene nucleous, such as the propyl radical or higher alkyl radicals, R is an intermediate aliphatic hydrocarbon radical, e. g., —CH₂—, etc., R₁ is a hydrocarbon radical which may be alkyl, aryl, or a heterocyclic or carbocyclic group, $m$ is two or more and $n$ is one in the case of a monoglycol ether and more than one in the case of a polyglycol ether radical.

The new compounds are produced by the reaction of a halide, e. g., a chloride containing the methylenedioxy phenyl group and having the following general formula:

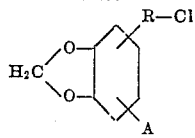

in which A and R have the meaning above given, with the sodium salt of a glycol ether or polyglycol ether having the following general formula:

in which $m$, $n$ and R₁ have the meaning above indicated; or by the reaction of the sodium salt of the hydroxide of the compound containing the methylenedioxy phenyl (or substituted phenyl) radical and having the formula:

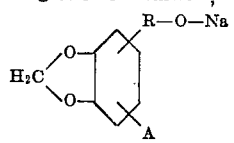

with the chloride of the glycol or polyglycol ether.

The monoglycol or polyglycol ethers, used in the form of their chlorides or sodium salts, in making the new compounds, include ethers of monoethylene glycol and polyethylene glycols as well as higher alkylene glycols and polyglycols and including the diethylene glycol monobutyl ether, the ethylene glycol monomethyl ether, the diethylene glycol ethyl ether, the triethylene glycol ethyl ether, the ethylene glycol butyl ether, other alkyl, e. g., hexyl and octyl ethers of ethylene glycol and diethylene glycol and ethers containing instead of an alkyl group an aryl, heterocyclic or carbocyclic group such as tetrahydrofurfuryl and phenyl ethers, as well as ethers of higher glycols and polyglycols such as propylene glycol, hexylene glycol, etc.

Instead of using the glycol ethers in the form of their sodium salts, for reaction with chlorides containing the methylenedioxy phenyl (or substituted phenyl) radical, the ethers can be used in the form of their chlorides for reaction with the sodium salts of the hydroxides containing the methylenedioxy phenyl (or substituted phenyl) group or radical.

The chloride (or other halides) containing the methylenedioxy phenyl (or substituted phenyl) group or radical include the chloromethyl derivative of dihydrosafrol having the following formula:

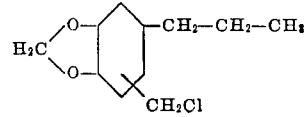

isosafrol hydrochloride or 1-(3,4-methylenedioxy phenyl)-chloropropane having the following formula:

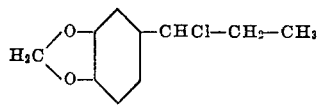

3-(3,4 - methylenedioxy phenyl)-bromopropane having the following formula:

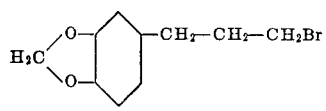

piperonyl bromide having the following formula

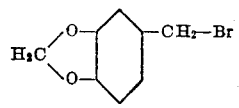

and other halogen derivatives containing the methylenedioxy phenyl (or substituted phenyl) groups or radicals.

Dihydrosafrol is a compound having the structural formula

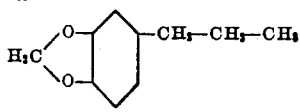

as described in Beilstein 19, 27 (1934).

Instead of using the halides containing the methylenedioxy phenyl (or substituted phenyl) group or radical, the sodium salts of the hydroxides can be similarly used. Thus the sodium salt of the hydroxy methyl derivative of dihydrosafrol can be produced from the chloromethyl dihydrosafrol by converting the chloride into the acetate and saponifying the acetate to give the alcohol. Alcohols having the following structure

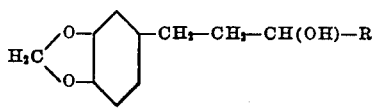

in which R is an alkyl group such as ethyl, propyl, amyl, hexyl, octyl, cycloalkyl, etc. can be produced by reduction of the unsaturated ketones of the following formula:

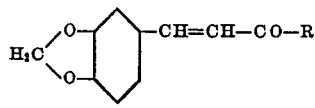

which ketones can be prepared by reacting piperonal with a methyl alkyl ketone containing two or more carbon atoms in the alkyl group in the presence of caustic soda or other alkaline materials. Among such ketones may be mentioned 3,4-methylenedioxy-styryl-hexyl ketone and similar ketones containing other alkyl groups instead of the hexyl group, e. g., ethyl, propyl, butyl, amyl, etc.

These unsaturated ketones, on hydrogenation, give alcohols which can be used in the form of their sodium salts for reaction with the chloride of the glycol or polyglycol ethers.

The chloromethyl dihydrosafrol above referred to can be readily prepared by the reaction of formaldehyde and hydrochloric acid on dihydrosafrol. The preparation of this product is illustrated by the following example, the parts being by weight:

162 parts of dihydrosafrol, 150 parts of 40% formaldehyde solution, and 500 parts of concentrated hydrochloric acid are mixed and agitated for a period of about 36 hours at a temperature below 20° C. The oily bottom layer is separated and the water layer is extracted with benzol. The benzol solution and the separated oil are combined and neutralized with sodium bicarbonate solution. The solution is dried, the benzol is distilled off, and the remaining oil is distilled in vacuo. The chloromethyl derivative distilled at about 128° C. at 4 mm. pressure. It is a colorless oil heavier than water. The chlorine content was determined by saponification and gave a saponification value of 265 (calculated 262).

The sodium salt of the hydroxy methyl derivative of dihydrosafrol can be prepared by converting the chloride into the acetate and saponifying the acetate to form the alcohol.

The new glycol and polyglycol ether derivatives containing the methylenedioxy phenyl (or substituted phenyl) group or radical are themselves in some cases valuable insecticides and in general are valuable synergists for use with pyrethrins, enabling a small amount of pyrethins to be effectively used in admixture with the new ether derivatives in insecticide compositions.

The invention will be further illustrated by the following specific examples, but the invention is not limited thereto:

*Example I.*—A particularly valuable product is obtained when the chloromethyl derivative of dihydrosafrol is reacted with the sodium salt of diethylene glycol monobutyl ether (butyl Carbitol) to form an ether derivative as illustrated by the following equation:

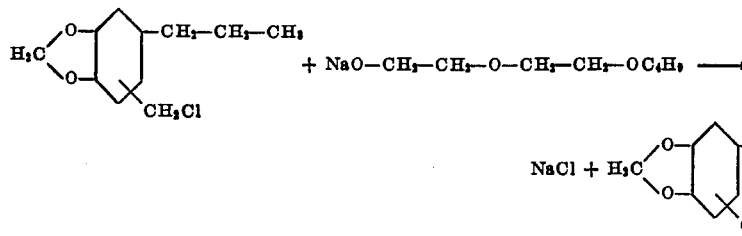

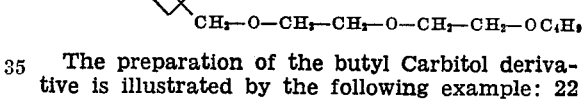

The preparation of the butyl Carbitol derivative is illustrated by the following example: 22 parts of sodium hydroxide pellets were added to 162 parts of butyl Carbitol in 90 parts of benzene, and the mixture was refluxed using a water trap until no more water was collected (approximately 18 hours).

The solution was cooled and under continued cooling 106 parts of chloromethyl compound in 45 parts of benzene were added. After standing overnight the mixture was refluxed for 4 hours. The salt which separates is removed by washing with water, the separated benzol solution is dried, the benzol is distilled off. The remaining oil may be distilled in vacuo. Some of the excess butyl Carbitol distills over, then the final product distills at about 195° at 2 mm. It is a colorless oil, soluble in benzene, isopropanol and most organic solvents.

The resulting product is a valuable insecticide raw material or synergist. When used with pyrethrin in the proportions of 30 mg. of pyrethin and 300 mg. of the above ether dissolved in 100 cc. of odorless kerosene, an insecticide spray is produced which will give practically complete knockdown and kill of flies. The above ether is completely miscible with kerosene and Freon (dichlordifluoromethane). It is chemically stable and is odorless and non-irritating, which is of primary importance in the compounding of household insecticides. Its combination of properties makes this product an outstanding insecticide ingredient.

The product produced from the chloromethyl derivative of dihydrosafrol and butyl Carbitol is high in insecticidal activity and it has the advantage of being completely soluble in Freon and in petroleum fractions.

*Example II.*—Instead of using the sodium salt of butyl Carbitol, as in Example I, the sodium salt of Carbitol (diethylene glycol monoethyl ether) is used in a similar way to produce a Carbitol ether boiling between 162–185° at 2 mm. At a concentration of 300 mg. of product and 30 mg. of pyrethrins in 100 cc. odorless base oil a knockdown of 94% and a kill of 76% was obtained, while the OTI gave a knockdown of 94% and a kill of 43%.

*Example III.*—Instead of using the sodium salt of butyl Carbitol, as in Example I, the sodium salt of butyl Cellosolve (ethylene glycol monobutyl ether) is used and the resulting ether boils at about 167° at 2 mm. 1000 mg. of this product and 30 mg. pyrethrins dissolved in 100 cc. base oil gave a knockdown of 96% and a kill of 86% in the Peet-Grady test, while the OTI was 96% and 54% respectively.

*Example IV.*—Instead of using the sodium salt of butyl Carbitol, as in Example I, the sodium salt of benzyl Cellosolve (ethylene glycol monobenzyl ether) is used, giving a resulting ether product boiling at 195–205° at 1.5 mm. 300 mg. of this product and 30 mg. of pyrethrins in 100 cc. base oil gave a knockdown of 98% and a kill of 76%, the OTI gave 96% and 54%.

*Example V.*—In a similar way, using the sodium salt of methyl Carbitol (diethylene glycol monomethyl ether) a complex ether was obtained boiling at 168° at .4 mm. 300 mg. of this product and 30 mg. of pyrethrins in 100 cc. base oil gave a knockdown of 99% and a kill of 94%, while the OTI was 99% and 54% respectively.

The above examples illustrate the production of the new ether derivatives by reaction of chloromethyl dihydrosafrol with ethylene and diethylene glycol ethers. Other derivatives can be obtained using other ethers of ethylene and polyethylene glycols or ethers of higher glycols, e. g., propylene or hexylene glycols as well as other polyalkylene glycol ethers.

When, instead of using the chloromethyl derivatives of dihydrosafrol, the sodium salts of hydroxy methyl dihydrosafrol is used, the glycol and polyglycol ethers are used in the form of their chlorides to react with the sodium salts.

The following examples illustrate the production of new compounds by the reaction of isosafrol hydrochloride with the sodium salts of glycol and polyglycol ethers.

As an example illustrating the preparation of the isosafrol hydrochloride or 1-(3,4 methylene dioxyphenyl)-chloropropane, hydrochloric acid gas was passed at room temperature into 162 parts by weight of isosafrol (1 mol) until a weight increase of 35 parts was obtained. This crude chloride was kept cold, at icebox temperatures, until used for further condensations. In the following examples, the parts are by weight:

*Example VI.*—61 parts of diethylene glycol monobutyl ether was dissolved in 45 parts benzol. 11 parts of sodium hydroxide pellets were added, and this mixture was refluxed using a water trap condenser until no more water would collect (boiling overnight was sufficient). The benzol solution was then cooled and under cooling with ice water 49.5 parts of the above chloride in 45 parts benzol was added. After standing overnight, the mixture was refluxed 4 hours. It was washed with water to remove the salt formed; the benzol was distilled off and the remaining product was distilled in vacuo. The final product boiled at 210–216° at 7 mm. It was a liquid readily soluble in the common organic solvents.

This product was tested by the Peet-Grady method, with the following results:

A solution of 2,000 mg. of this product in 100 cc. of kerosene, when tested by this test, showed a knockdown of 93% (30 minutes) and a kill of 98%. A solution of 300 mg. of this product and 30 mg. of pyrethins dissolved in 100 cc. of deodorized kerosene gave a knockdown of 97% in ten minutes and a kill of 97%.

The marked synergistic effect of the new product is indicated by the fact that a solution of 30 mg. of pyrethins in 100 cc. of the deodorized kerosene will give a kill of less than 20%, while a solution containing 300 mg. of the new product in 100 cc. of kerosene shows practically no knockdown. But when these amounts of pyrethin and of the new compound were used together, the new product was shown to be a powerful synergist; while the test made with larger amounts of the new product by itself also showed it to be a powerful insecticide.

The Peet-Grady method of testing is a recognized test which will give reproducible results, and a satisfactory result obtained with this test in the Peet-Grady chamber classes a compound as a potential insecticide for a variety of insects.

*Example VII.*—28.5 parts of ethylene glycol monomethyl ether was dissolved in 45 parts benzol, 17 parts sodium hydroxide pellets were added and this mixture was refluxed using a water trap condenser until no more water would collect (boiling overnight). The benzol solution was then cooled and under cooling with ice water 49.5 parts of the 1-(3,4 methylene dioxyphenyl)-chloropropane in 45 parts benzol was added. After standing overnight, the mixture was refluxed 4 hours, it was washed with water to remove the salt formed, the benzol was distilled off, and the remaining product was distilled in vacuo. The final product boiled at 165° to 168° at 1.5 mm. It was soluble in the common organic solvents.

This product was also tested by itself and with pyrethrin and shown to be a powerful insecticide and synergist, as indicated by the following tests. 300 mg. of this product and 30 mg. of pyrethins in 100 cc. of deodorized kerosene gave a knockdown of 99% and a kill of 88% when tested according to the Peet-Grady method. The kill of a solution containing 2000 mg. of this product in 100 cc. of deodorized kerosene was 93%.

*Example VIII.*—In the manner described for Examples 1 and 2 the sodium salt of ethylene glycol monobenzyl ether was condensed with the 1-(3,4 methylene dioxyphenyl)-1-chloropropane to give the corresponding ether which was a liquid boiling at 182–192° at 2 mm. It was readily soluble in the common organic solvents. When tested in the Peet-Grady chamber in a concentration of 300 mg. of this product and 30 mg. of pyrethrins in 100 cc. of odorless base oil, it showed a knockdown of 98% and a kill of 76%. A solution containing 2000 mg. of this product in 100 cc. of odorless base oil showed 88% kill.

In a similar way, other ethers can be produced by the reaction of the sodium salts of the glycol ethers with the 1-(3,4 methylene dioxyphenyl) chloropropane, using other monoethers of alkylene glycols. The ethyl, hexyl, octyl, tetrahydrofurfuryl and phenyl ethers of ethylene glycol, the ethyl and methyl ethers of diethylene glycol, the butyl ether of propylene glycol, and the methyl and butyl ethers of hexylene glycol were all reacted in a similar way with the isosafrol hydrochloride to form new ether derivatives, and were found to be useful as insecticides.

The new products have the advantage of being readily soluble in most common organic solvents, and particularly in kerosene, which is commonly used as the vehicle for household sprays.

The new products are also readily soluble in liquids of the Freon type such as Freon 12, methyl chloride or others, which are gases at ordinary pressure and are used as propellants for insecticides. Such solutions or combinations of such solutions with pyrethins may be used as insecticides. The following example will illustrate the effectiveness of such solutions:

*Example IX.*—600 mg. of pyrethrins under certain test conditions gave a knockdown of approximately 85% in 10 minutes and a kill of 46%. A similar solution containing 600 mg. of pyrethrins and 1000 mg. of the product described in Example VI above gave a knockdown of 97.5% and a kill of 97.5%.

The products can also be used as active ingredients of insecticidal dusts. Thus a dust base containing 2.5% of compound and 0.2% pyrethrins may be prepared by incorporating the required ingredients into a carrier such as exhausted pyrethrum flowers (which are obtained as by-products of the pyrethrum extract manufacture). The dust base may be further diluted with 3 or 4 parts of an inert carrier such as talc and the resulting dust will be active against a wide variety of insects.

*Example X.*—The bromide having the following structure

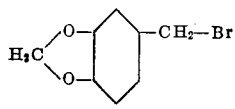

was reacted with the sodium salt of methyl Cellosolve (ethylene glycol monomethyl ether) to yield the ethylene glycol-methyl-(3,4 methylenedioxy benzyl) ether. This is a liquid boiling at 142.5–144.5° at 3.7 mm. 300 mg. of this product and 30 mg. of pyrethrins dissolved in 100 cc. of odorless base oil showed a kill of 43% in the Peet-Grady chamber against a kill of 52% for the OTI. While this result is considerably poorer than the results obtained with other compounds of the series, it still definitely shows that the material adds considerably to the insecticidal activity of the pyrethrins.

*Example XI.*—The bromide of Example X was reacted with the sodium salt of butyl Carbitol (diethylene glycol monobutyl ether) to yield the diethylene glycol-butyl-(3,4 methylenedioxy benzyl) ether. This product was a liquid, boiling at 200 to 205° at 5 mm. A combination of 300 mg. of this ether and 30 mg. of pyrethrins dissolved in 100 cc. odorless base oil showed a kill of 92% against a kill of 52% for the OTI.

*Example XII.*—The bromide of Example X was reacted with the sodium salt of phenyl Cellosolve (ethylene glycol monophenyl ether) to give the ethylene glycol - phenyl - (3,4 methylenedioxy) - benzyl ether, which was obtained as a liquid boiling at about 167° at .4 mm. 300 mg. of this product and 30 mg. of pyrethrins in 100 cc. base showed a kill of 46% against a kill of 52% for the OTI.

*Example XIII.*—The bromide of the following structure, above referred to, having the following formula

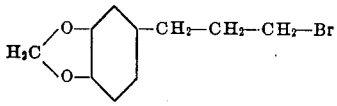

was reacted with sodium salt of butyl Cellosolve (ethlyene-glycol-mono-butyl ether) to yield the ethylene-glycol-butyl-(3,4 methylenedioxy phenyl propyl) ether, which boiled at 165–171° at .7 mm. 300 mg. of this product and 30 mg. of pyrethrins in 100 cc. base oil gave a kill of 90.5% against an OTI kill of 52%. The corresponding butyl Carbitol ether or diethylene-glycol-butyl-(3,4-methylenedioxy phenyl propyl) ether boiled at about 182° at 0.7 mm. 300 mg. of the ether and 30 mg. of pyrethrins in 100 cc. base gave a kill of 92% against an OTI kill of 52%.

In the above examples the new compounds are described as prepared by the method of reacting a halogen derivative containing the methylenedioxyphenyl group or radical with the alkali compound of an alkylene and polyalkylene glycol ether. Sodium alcoholates containing the methylenedioxyphenyl group, when reacted with the chlorides of the alkylene glycol or polyalkylene glycol ethers, will also yield the same new products. Thus the ethylene-glycol-methyl-(3,4 methylenedioxy)-benzyl ether may be prepared by reacting the 3,4 methylenedioxy benzyl bromide with the sodium salt of methyl Cellosolve or by reacting the 3,4 methylenedioxy benzyl alcohol with methyl Cellosolve chloride

Reference is made to my co-pending applications Serial No. 658,872, filed April 1, 1946, and Serial No. 77,686, filed February 21, 1949, respectively, and also to my application Serial No. 688,967, filed August 7, 1946, now abandoned.

I claim:

1. The compounds of the generic formula

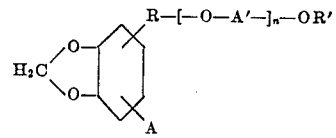

in which R is a saturated, bivalent, aliphatic, hydrocarbon radical, A is a substituent selected from the group consisting of the hydrogen atom and alkyl radicals, R' is a substituent selected from the group consisting of alkyl, cycloalkyl, aralkyl, aryl and heterocyclic radicals, A' is a saturated, bivalent, aliphatic, hydrocarbon radical having from two to three carbon atoms and $n$ is an integer from one to three.

2. The compounds of the generic formula

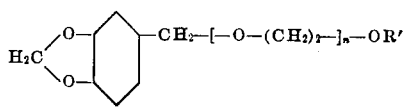

in which R' is a substituent selected from the group consisting of alkyl, cycloalkyl, aralkyl, aryl and heterocyclic radicals, and $n$ is an integer from one to three.

3. The compounds of claim 2 in which R' is an alkyl radical.

4. The compound of claim 2 in which R' is the n-butyl radical and $n$ is two.

5. The compounds of the generic formula

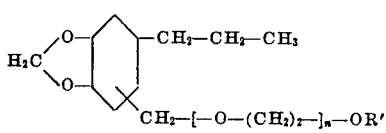

in which R' is a substituent selected from the group consisting of alkyl, cycloalkyl, aralkyl, aryl and heterocyclic radicals, and $n$ is an integer form one to three.

6. The compounds of claim 5 in which R' is an alkyl radical.

7. The compounds of claim 5 in which R' is the n-butyl radical and $n$ is two.

8. The compounds of the generic formula

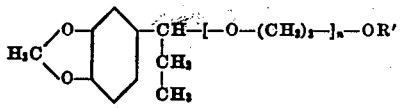

in which R' is a substituent selected from the group consisting of alkyl, cycloalkyl, aralkyl, aryl and heterocyclic radicals, and n is an integer from one to three.

9. The compounds of claim 8 in which R' is an alkyl radical.

10. The compound of claim 8 in which R' is the n-butyl radical and n is two.

11. The method for the preparation of compounds of the generic formula

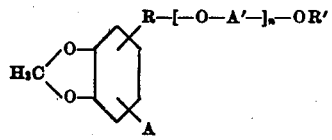

in which R is a saturated, bivalent, aliphatic, hydrocarbon radical, A is a substituent selected from the group consisting of hydrogen and alkyl radicals, R' is a substituent selected from the group consisting of alkyl, cycloalkyl, aralkyl, aryl and heterocyclic radicals, A' is a saturated, bivalent, aliphatic, hydrocarbon radical having from two to three carbon atoms, and n is an integer from one to three, the said method comprising reacting with the splitting off of a sodium halide an organic sodium alcoholate and an organic halide, the organic radical of one of the organic reactants being

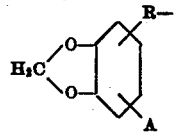

and the organic radical of the other organic reactant being

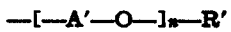

12. The method for the preparation of the compounds of the generic formula

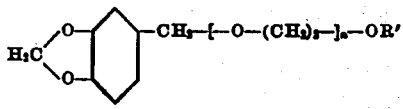

in which R' is a substituent selected from the group consisting of alkyl, cycloalkyl, aralkyl, aryl and heterocyclic radicals, and n is an integer from one to three, the said method comprising reacting with the splitting off of a sodium halide an organic sodium alcoholate and an organic halide, the organic radical of one of the organic reactants being

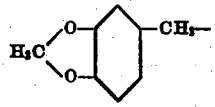

and the organic radical of the other organic reactant being

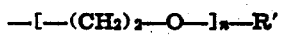

13. The method of claim 12 in which R' is an alkyl radical.

14. The method of claim 12 in which R' is the n-butyl radical and n is two.

15. The method for the preparation of the compounds of the generic formula

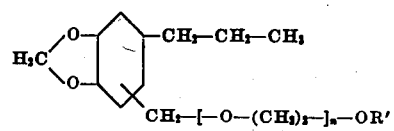

in which R' is a substituent selected from the group consisting of alkyl, cycloalkyl, aralkyl, aryl and heterocyclic radicals, and n is an integer from one to three, the said method comprising reacting with the splitting off of a sodium halide an organic sodium alcoholate and an organic halide, the organic radical of one of the organic reactants being

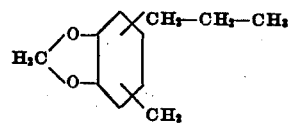

and the organic radical of the other organic reactant being

16. The method of claim 15 in which R' is an alkyl radical.

17. The method of claim 15 in which R' is the n-butyl radical and n is two.

18. The method for the preparation of the compounds of the generic formula

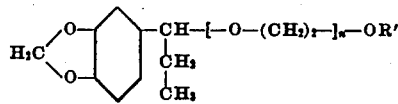

in which R' is a substituent selected from the group consisting of alkyl, cycloalkyl, aralkyl, aryl heterocyclic radicals, and n is an integer from one to three, the said method comprising reacting with the splitting off of a sodium halide an organic sodium alcoholate and an organic halide, the organic radical of one of the organic reactants being

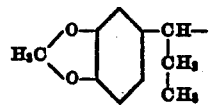

and the organic radical of the other organic reactant being

19. The method of claim 18 in which R' is an alkyl radical.

20. The method of claim 18 in which R' is the n-butyl radical and n is two

HERMAN WACHS.

REFERENCES CITED

The following references are of record in the file of this patent:

UNITED STATES PATENTS

| Number | Name | Date |
| --- | --- | --- |
| 2,265,155 | Geary | Dec. 9, 1941 |
| 2,417,584 | Birkinshaw et al. | Mar. 18, 1947 |
| 2,421,569 | La Forge et al. | June 3, 1947 |
| 2,421,570 | La Forge | June 3, 1947 |
| 2,421,770 | Bludworth et al. | June 10, 1947 |

Certificate of Correction

Patent No. 2,485,681                                            October 25, 1949

HERMAN WACHS

It is hereby certified that errors appear in the printed specification of the above numbered patent requiring correction as follows:

Column 1, line 8, for "methylenedoxy" read *methylenedioxy*; line 28, for "nucleous" read *nucleus*; column 2, line 26, for "chloride" read *chlorides*; column 4, line 55, and column 6, line 11, for "pyrethin" read *pyrethrin*; column 6, lines 2, 7, and 40, and column 7, line 4, for "pyrethins" read *pyrethrins*; column 10, line 22, for that portion of the formula reading "$CH_2$" read $CH_2$—; column 10, line 39, after "aryl" insert *and*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*